United States Patent [19]
Schroeder

[11] Patent Number: 5,409,327
[45] Date of Patent: Apr. 25, 1995

[54] LOCK WIRE NUT DRILLING

[75] Inventor: Monte L. Schroeder, Enumclaw, Wash.

[73] Assignee: The Boeing Company, Seattle, Wash.

[21] Appl. No.: 227,938

[22] Filed: Apr. 15, 1994

[51] Int. Cl.$^6$ .............. B23B 49/02; B23B 35/00; B23B 41/00

[52] U.S. Cl. .................. 408/1 R; 279/46.6; 279/152; 408/17; 408/71; 408/115 B

[58] Field of Search ............... 408/1 R, 72 B, 103, 408/115 R, 115 B, 241 B, 17, 71; 279/46.6, 5, 152; 470/18, 87

[56] References Cited

U.S. PATENT DOCUMENTS

| | | |
|---|---|---|
| 2,722,698 | 11/1955 | Green . |
| 3,357,281 | 12/1967 | Stephens .................. 408/103 |
| 3,593,984 | 8/1969 | Carman et al. . |
| 3,761,193 | 9/1973 | Del Giudice .............. 408/115 R |
| 3,955,896 | 6/1976 | Davis . |
| 5,141,368 | 8/1992 | Bullard et al. ............. 408/1 R |

FOREIGN PATENT DOCUMENTS

| | | |
|---|---|---|
| 1115864 | 9/1984 | U.S.S.R. .................. 408/115 R |
| 001731459 | 5/1992 | U.S.S.R. .................. 408/115 B |

OTHER PUBLICATIONS

All American's New, Model SF-4 Safety Wire Drilling Fixture Advertisement.

ACCUTECH Drilling Station Brochure, Richards Corp., Sterling, Va.

Primary Examiner—Steven C. Bishop
Attorney, Agent, or Firm—J. Michael Neary

[57] ABSTRACT

An apparatus for drilling lock wire holes in lock wire nuts includes a variable speed drill press mounted on a work bench and having a vertically movable drill quill supporting a rotating drill spindle on one end of which is mounted a drill chuck for holding and driving a drill bit for drilling a hole in the lock wire nuts. An N/C microprocessor is coupled to the drill press for controlling the vertical motion of the drill quill in a peck drill cycle. A nut holder, including a collet chuck having three jaw inserts is mounted in a chuck indexer for positioning the chuck in any of three 120° angularly spaced positions about a central longitudinal axis through the chuck. A drill guide in each of said jaw inserts guides the drill bit at an angle against said faces of said nuts to drill lock wire holes through the nut lobes. The chuck indexer is mounted on an X-Y positioner, in turn mounted on the work bench, for positioning the drill guide in the jaw inserts to be drilled through precisely in alignment with the drill in the drill press. The jaw inserts are indexed one by one in the chuck in line with the drill bit and the N/C microprocessor controls the drill press to execute the peck drill cycle through the drill guide to drill a lock wire hole through the desired lobes of the lock wire nut.

10 Claims, 5 Drawing Sheets

LOCK WIRE NUT DRILLING

This invention relates to drilling lock wire holes through the lobes of a lock wire hex nut, and more particularly to a method and a machine for quickly easily and accurately drilling lock wire holes through the lobes of a lock wire hex nut.

BACKGROUND OF THE INVENTION

Lock wire hex nuts are conventional hex nuts having holes drilled through one or more outer hex lobes in the hex nut to receive a lock wire which can be secured to a adjacent fixed structure to prevent the nuts from loosening and rotating in service. The drilling of a lock wire hole in a hex nut in the past has been an awkward and time consuming task, often resulting in broken drill or a scraped part because of the inherent difficulties in the task. The lock wire hole in the hex nut lobe is drilled at a thirty degree angle to the face of the nut and this sharp angle often results in drilling problems because the angle of the nut face tends to devert the line of action of the drill, often resulting in broken drills and possible a damaged part.

Drill jigs and commercially produced machines for aiding in the drilling for the lock wire holes have somewhat improved the process, but difficulties are still encountered. The angle of the nut face still tends to divert the line of action of the drill resulting in either a broken drill or an imperfect hole through the lock wire nut lobe, and the drill bit tends to become quickly clogged with drill chips since the diameter of the lock wire hole is usually on the order of 1/16th of an inch. The set up time to install the lock wire nut in the drilling jig has proven to be excessive and is such a tedious and slow operation that operators despise the job and try to avoid it. Thus, the art has long sought in vain and apparatus for drilling lock wire holes in lock wire nuts that is fast and easy, requires little set up time, does not result in excessive breakage of drill bits and operates the drilling cycle automatically to free the operator for deburring the nuts through the drilling cycle of the next nut.

SUMMARY OF THE INVENTION

Accordingly, it is an object of this invention to provide a method and apparatus for quickly and easily drilling lock wire holes through the lobes of locker hex nuts. Another object of the invention is to provide an apparatus for drilling lock wire holes through the lobes of lock wire hex nuts without excessive breakage of drill bits. Yet another object of the invention is to provide a machine for drilling lock wire holes in the lobes of lock wire hex nuts which requires short and easy set up time for the operator and automatically performs the drilling cycle to free the operator for other tasks while drilling is being performed.

These and other objects of the invention are attained in a method and apparatus for drilling lock wire holes in the lobes of lock wire hex nuts, including a collet chuck for holding a plurality of jaw inserts sized to grip a particular size hex nut, and indexer in which the collet chuck is mounted for indexing the collet chuck in line with the line of action of a drill bit held in a drill press mounted adjacent to the collet chuck. The jaw inserts have installed a drill bushing positioned to present the drill bit held in the drill press to the lock wire nut at the proper angle. The collet chuck, when tightened on the nut, presses the jaw inserts with substantial force against the faces of the nut so that the drill guide bushing is forced against the face of the nut with substantial pressure. The drill bit is aligned with one of the drill guide bushings and is guided by the bushing to drill the lock wire hole in the nut. The drill press is operated automatically by a micro processor which operates a peck drilling cycle in which the drill bit is repeatedly advanced and retracted to clear the chips from the small diameter drill bit. After the lock wire hole is drilled completely through the lobe of the lock wire nut, the indexer is operated to rotate the collet chuck 120° to present the lobe once removed from the just drilled lobe to the line of action to the drill, and a second lock wire hole is drilled in the same manner as the first. A third lock wire hole may be drilled similarly if desired in the next 120° position of the collet chuck. After drilling, the positioned lever is operated to release the pressure of the collets on the nut and the nut is removed and a new nut is installed to repeat the process. During the automatic drilling of the lock wire holes through the holes of the lock wire nut, the operator deburrs the nut just drilled on a deburring grinder set up next to the drilling apparatus.

DESCRIPTION OF THE DRAWINGS

The invention and its many attended objects and advantages will become better understood upon reading the following description of the preferred embodiment in conjunction with the following drawings, wherein.

DESCRIPTION OF THE PREFERRED EMBODIMENT

Figure 1:
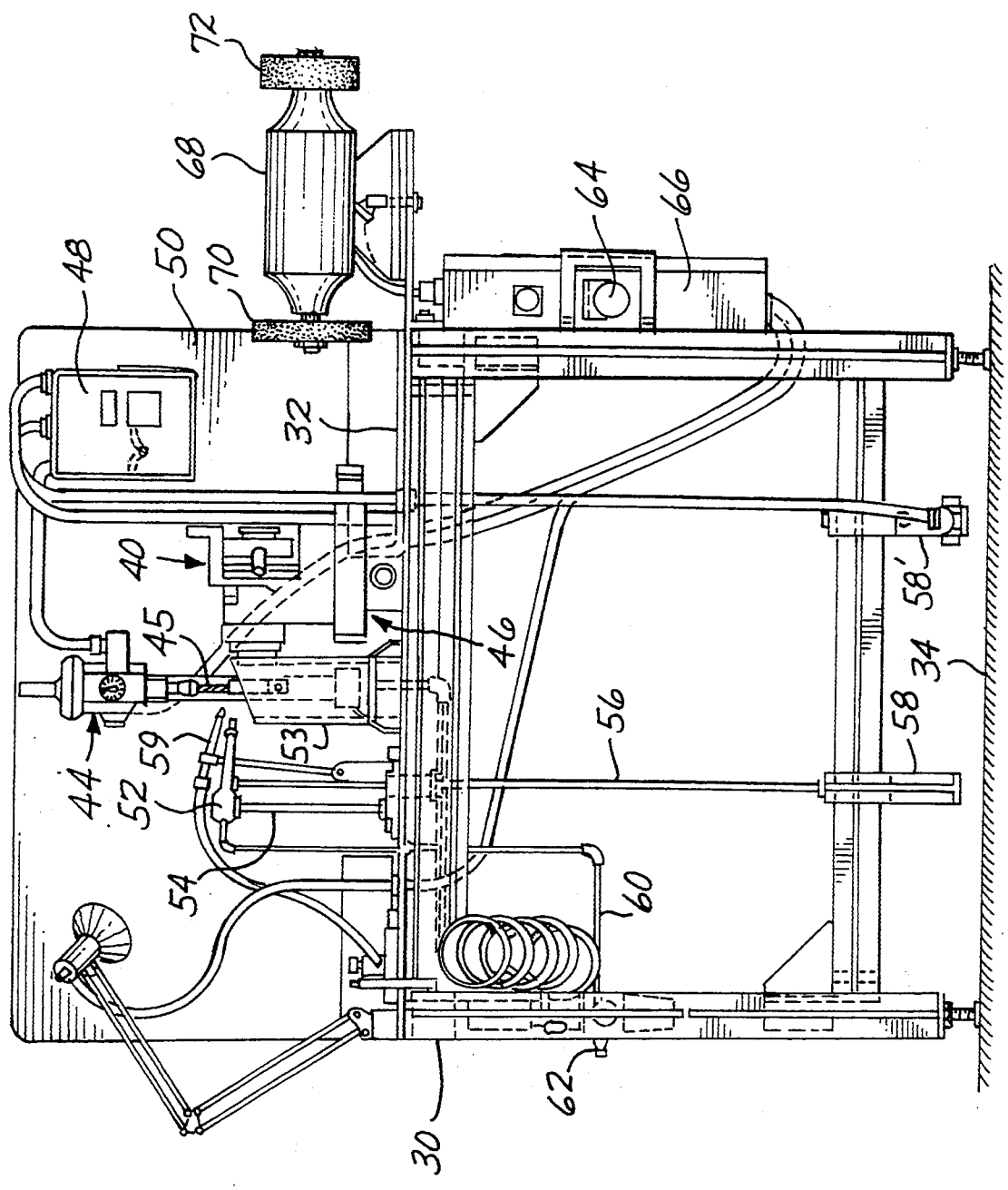
FIG. 1 is a front elevation of a work bench in which the drilling and deburring apparatus according to this invention is set up.
Figure 2:
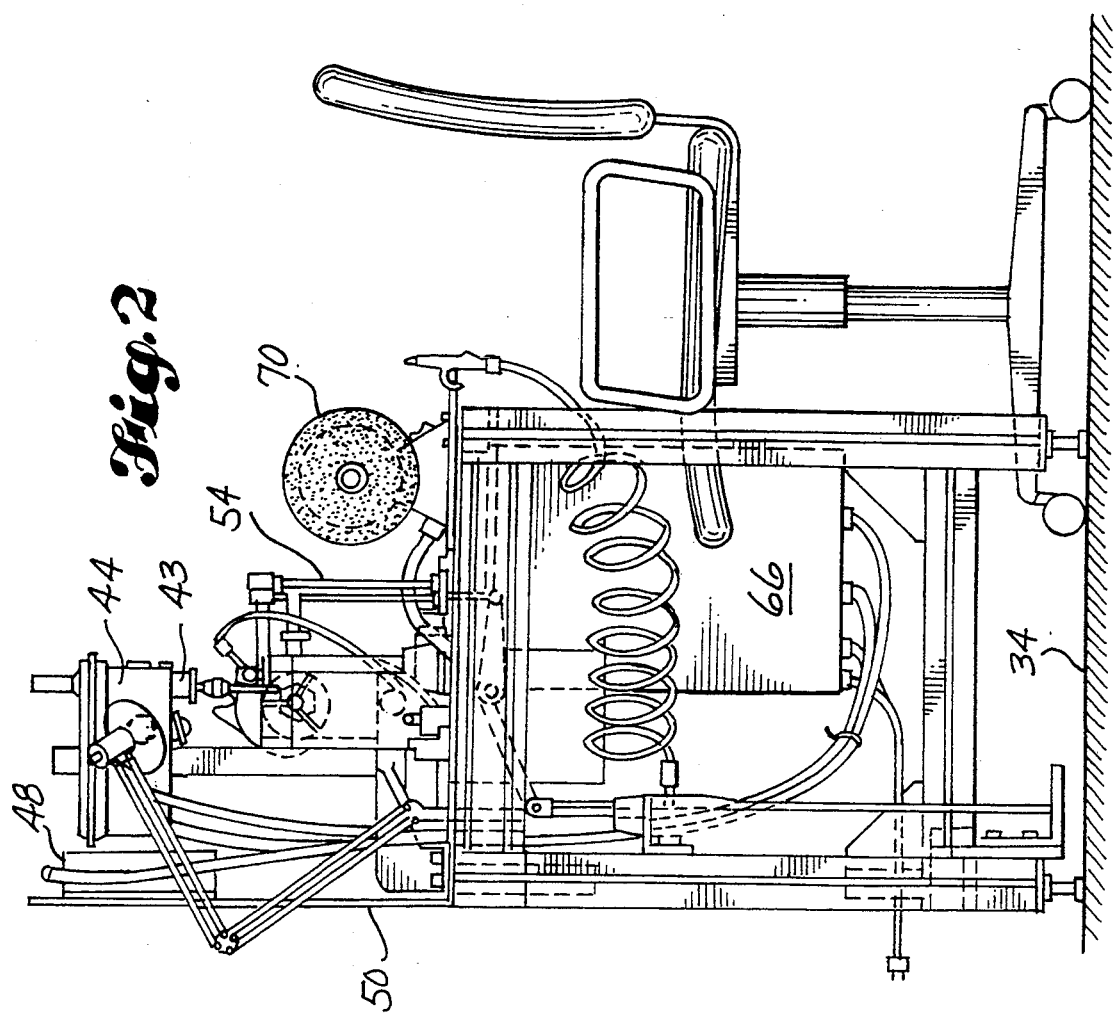
FIG. 2 is a side elevation of the bench and apparatus shown in FIG. 1.

Turning now to the drawings wherein like reference characters designate identical or corresponding parts, and more particularly to FIGS. 1 and 2 thereof, the invention is shown mounted on a work bench 30 having an upper work surface 32 elevated at a suitable working height above the floor 34. All of the equipment necessary for drilling and deburring the lock wire nuts is mounted on the work bench 30 within easy convenient reach by the operator. The apparatus includes a collet indexer 40, shown in more detail in FIG. 3, holding a collet chuck 42 in which the lock wire nut is held for drilling. A drill press 44, having a vertically plunging drill quill 43 supporting a drill spindle on which is mounted a drill chuck for holding a drill bit 45, is mounted on the bench 30 over the collet chuck. The indexer is mounted on an X-Y positioner 46 mounted on the bench 30 for precisely adjusting the position of the indexer to align drill guides in three jaw inserts afixed to the collet chuck 42 with the line of action of the drill 45 in the drill press.

An N/C microprocessor 48 is mounted on a backboard 50 attached to the bench 30 for controlling a peck drill cycle for the drill press 44. A mist coolant spray nozzle 52 is mounted on a stand 54 on the bench 30 and is connected to a pump for continuously spraying a mist coolant and cutting fluid on the drill 45 in the drill press 44. The mist coolant nozzle 52 has an adjustable valve for regulating the spray rate on the drill, as set by the operator. The coolant/cutting fluid drips into a receptacle 53 for collection, filtering, and repumping back through the coolant nozzel 52. An air nozzle 59, controlled by a valve connected through a linkage 56 to a foot pedal 58, is mounted in a position to blow air on the drill bit 45 and the jaw inserts in the collet chuck 42 to facilitate clearing chips, and is connected through a pipe network 60 to a air coupling 62 for connection of the bench to a source of air pressure such as plant air. An emergency stop switch 64 is provided at a easily excessible location on a cabinet 66 to which power lines extend from all power operations on the bench so the operator can completely shut off power to every power device on the bench with a single switch. A bench grinder 68 having deburring wheels 70 and 72 is mounted at the end of the bench 30 for removing burrs from a lock wire nut while a second lock wire nut is being automatically drilled under control of the N/C microprocessor 48. The operation of the microprocessor 48 is initiated by a second foot pedal 58'.

Figure 3:
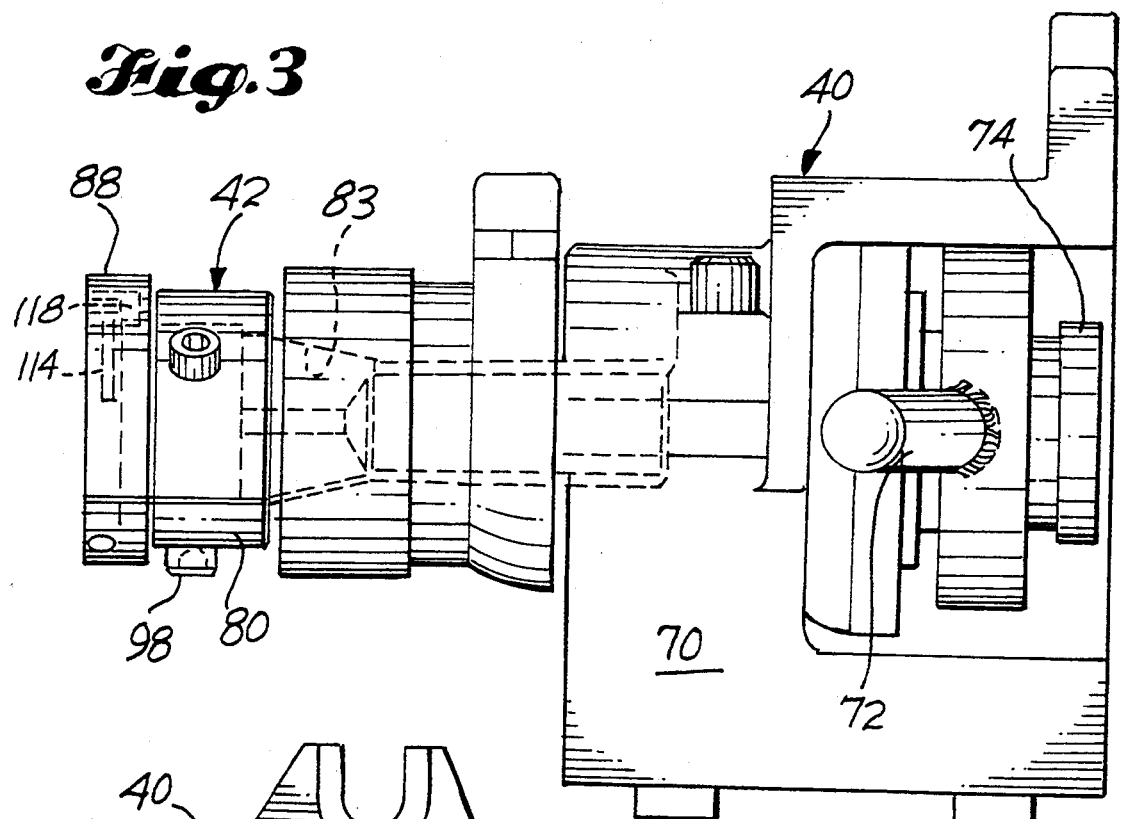
FIG. 3 is an enlarged elevation of the collets mounted in a collet chuck which in turn is mounted in an indexer on the assembly illustrated in FIG. 1.
Figure 4:
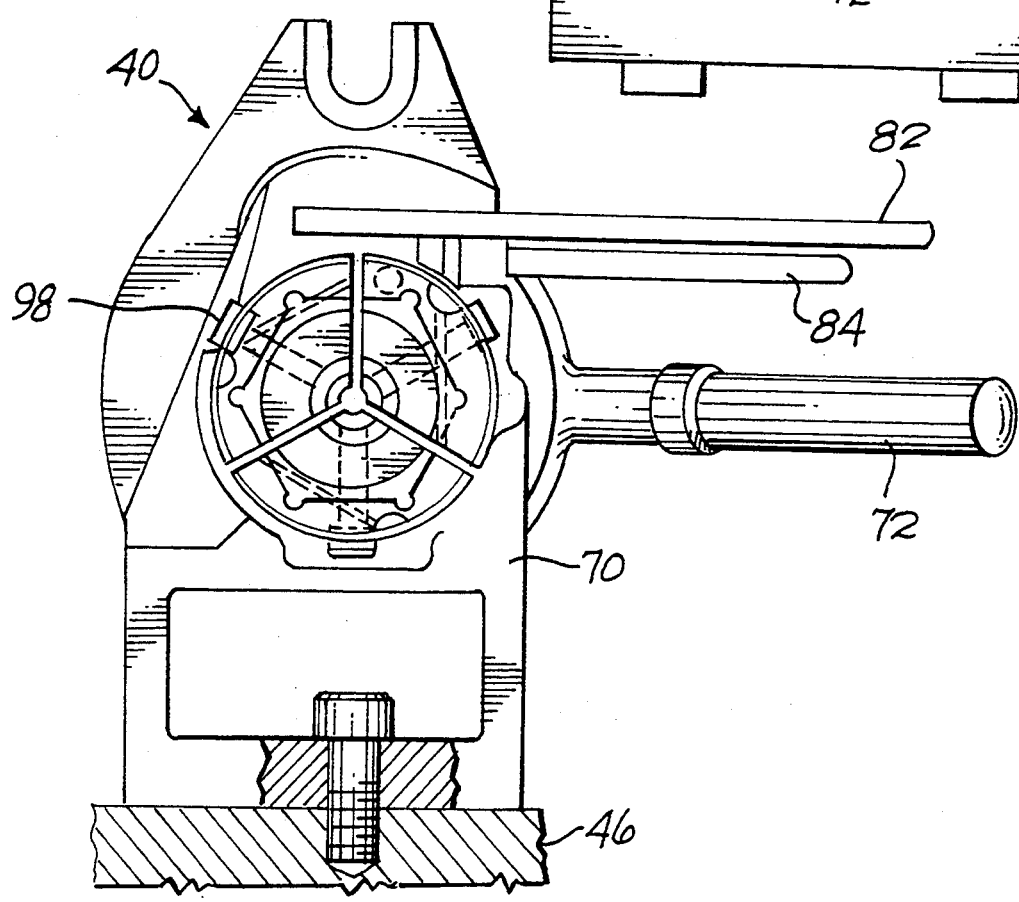
FIG. 4 is an end elevation of the apparatus shown in FIG. 3.

Turning now to FIG. 3, the collet indexer 40 is shown having a heavy steel housing 71 in which is mounted a collet draw bar quill controlled by a external operating lever 72 and a knob 74. The knob 74 controls the depth that the tapered end 76 of a collet chuck 80 is drawn into a tapered opening 83 at the front end of the housing 70, which in turn controls the radial contraction of the split end of a collet receptacle 80 at the distal end of the collet chuck 42. A pair of levers 82 and 84 control the adjustable indexing of the collet chuck 42 which enables the collet chuck to be shifted angularity to any of a number of preset angular positions. As used in this application, the indexer 40 is set to index the collet chuck 120° each time the indexer is shifted, to align drill bushings in the collets with the line of action the drill 45 in the drill press 44, as explained below. The indexer is a commercial item commonly known as a 5-C collet indexer, and is available from Travers Tool Company in Flushing, N.Y.

Figure 5:
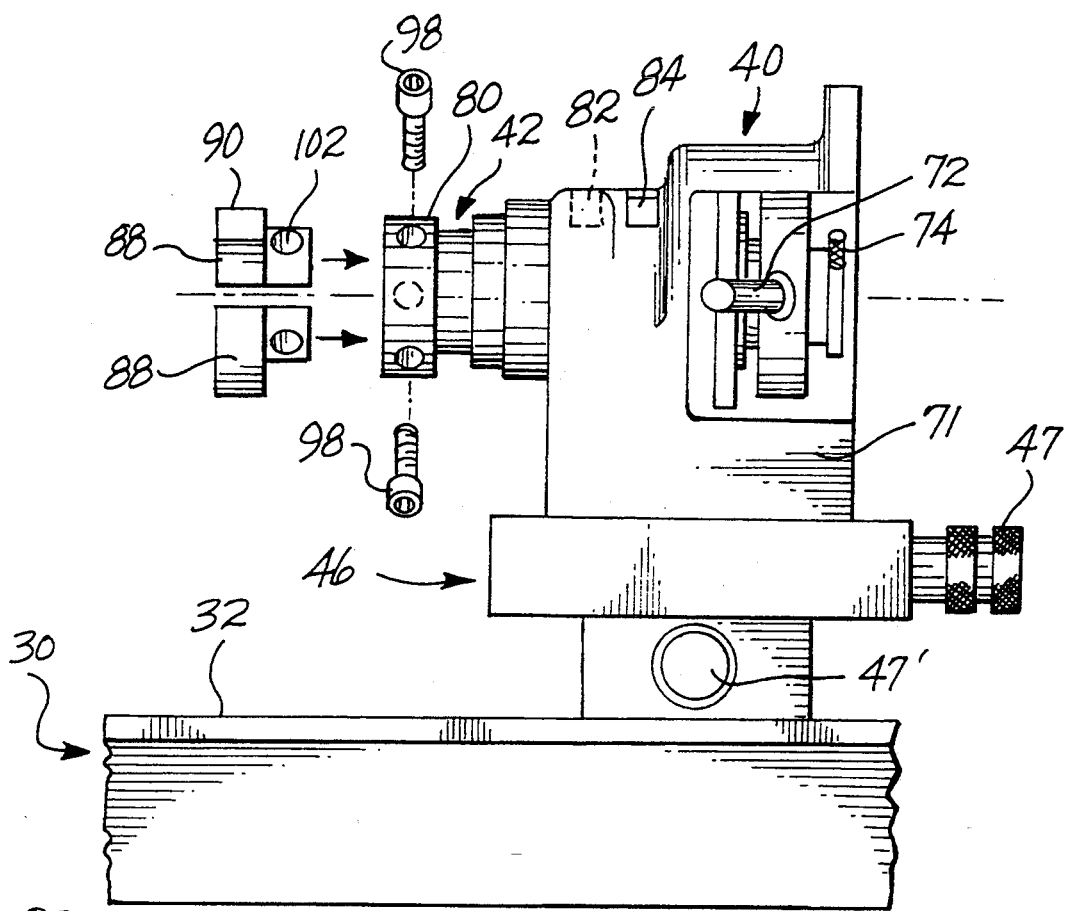
FIG. 5 is a view similar to FIG. 3 but showing the indexer mounted on an X-Y positioner and showing the jaw inserts exploding out of the collet chuck.
Figure 6:
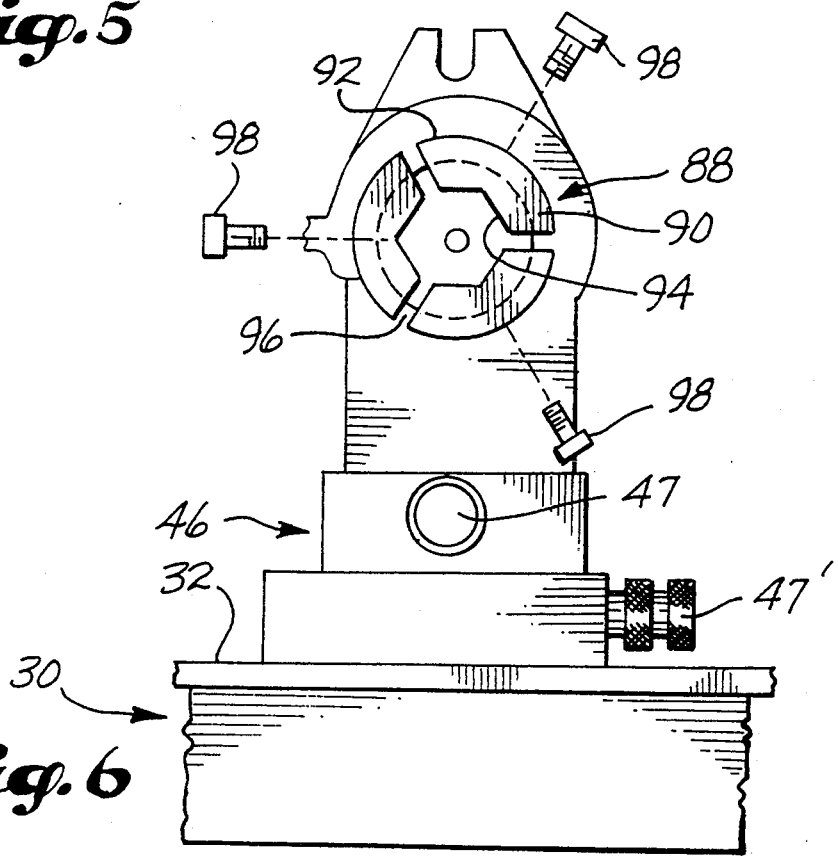
FIG. 6 is an end elevation of the apparatus shown in FIG. 5.
Figure 8:
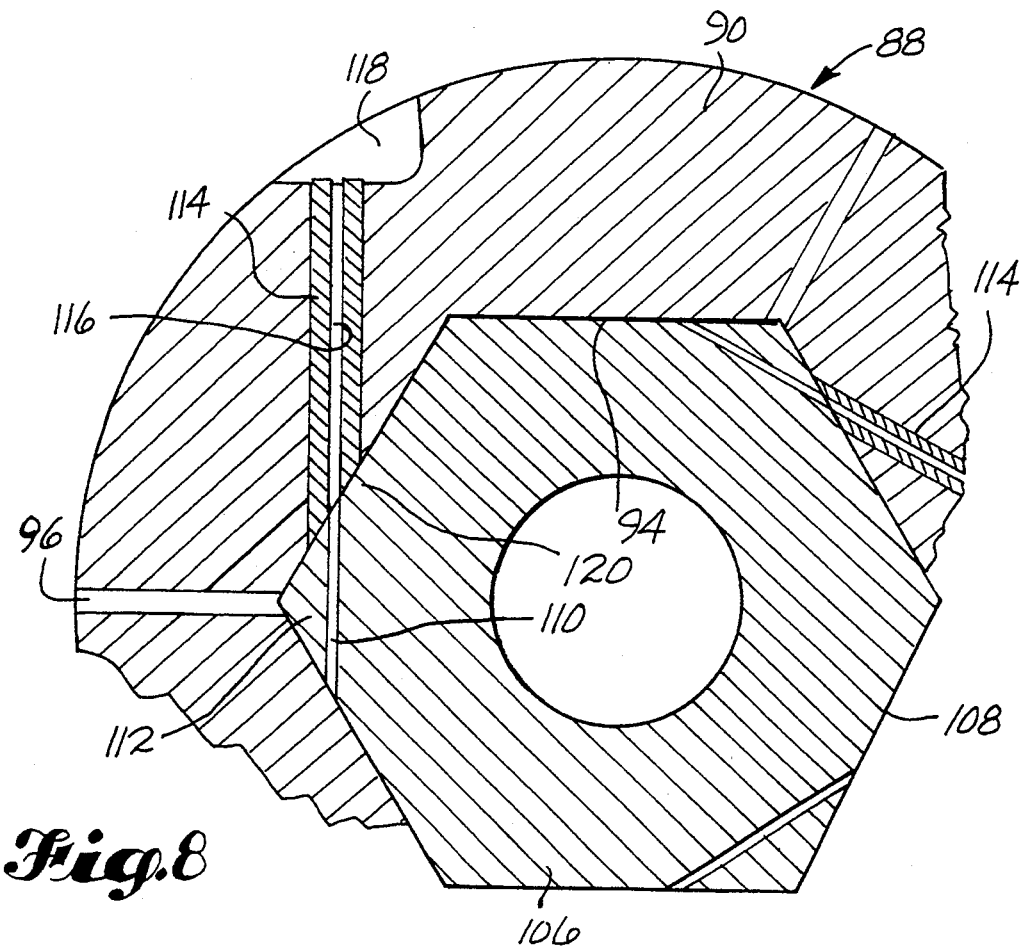
FIG. 8 is a elevation of the collet chuck removed from the indexer shown in FIG. 3 and 5.
Figure 7:
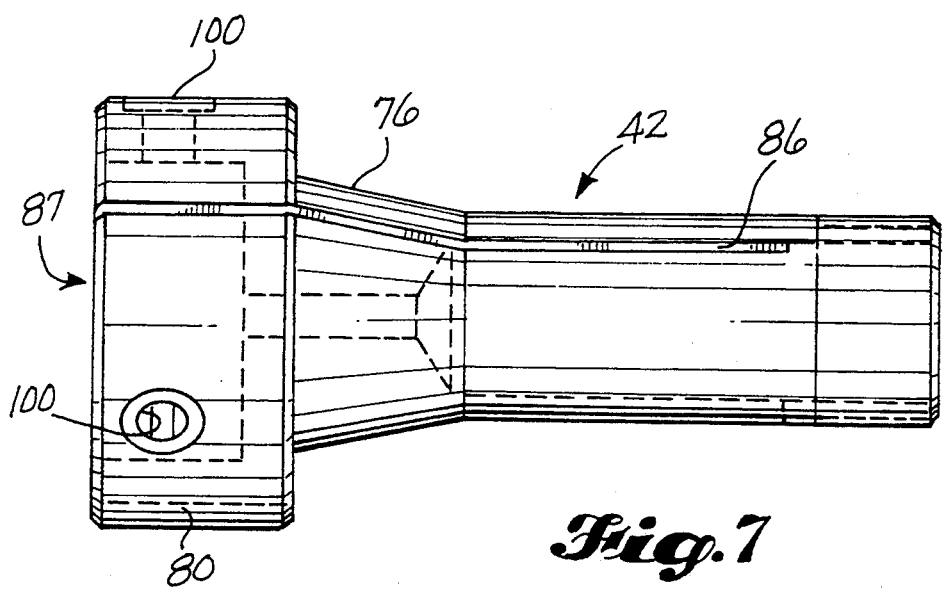
FIG. 7 is an enlarged sectional elevation of the jaw inserts gripping a lock wire hex nut showing the position of the drill guides in the jaw inserts.

The collet chuck 42 shown installed in the indexer 40 in FIG. 3 and shown separately in FIG. 7 has a series of three longitudinal slits 86 extending from the left hand end of the collet receptacle 80 well toward the right hand of the collet chuck 42. The slits 86 enable the collet chuck to be radially contracted to squeeze the jaw inserts against the nut held between the jaw inserts in the collet receptacle 80. The collet receptacle 80 has an axially opening cup shaped opening 87 in the receptacle 80 to receive three stepped jaw inserts 88, two of which are shown in FIG. 5 and all of which are identical in configuration. As shown in FIGS. 6 and 8, the jaw inserts 88 include an end flange 90 which has a cylindrical outer surface and a radially inwardly facing surface angled at 120° to correspond to the 120° angle formed by two adjacent faces of the lock wire nut. A radial gap 96 is left between the three jaw inserts 88 to leave room for them to converge radially inward to engage a nut which is placed in the hexagonal space between the jaw inserts 88 within the collet receptacle 80 when the operating handle 72 is moved to pull the collet chuck 42 axially into the indexer body. A screw 98 extends thorough a radial hole 100 through each of the lobes of the collet receptacle 80 and is threaded into a threaded hole 102 in the jaw inserts 88 to hold the jaw inserts against the inside surface of the collet receptacle 80.

Turning now to FIG. 8, a lock wire nut 106 is shown gripped between three jaw inserts 88, only one of which is shown completely. The radially facing inner surface 94 of each jaw inserts is shown engaged with the angled peripheral faces 108 of the nut 106 to securely hold the nut 106 in position during drilling of the lock wire holes 110 through the lobes 112 of the nut 106.

A drill guide bushing 114 is installed in a hole drilled into the end flange 90 of each jaw inserts 88 and communicates at an outer end with a notch 118 milled into the outside of the cylindrical surface of the end flange 90. The inner end 120 of the drill guide bushing 114 is chamfered at a 30° angle from the axis of the bushing to provide a face flush with the inner surface 94 of the flange 90. The flush face :120 of the drill guide bushing 114 engages the face 108 of the nut 106 when the nut is clamped between the jaw inserts 88. The engagement with the inner face 120 of the drill guide bushing 114 against the face 108 of the nut 106 is a high pressure interface to ensure that the drill bit 45 in the drill press 44 is not diverted by engagement with the angled surface 108 of the nut 106 when the drill bit reaches the end of the drill guide bushing 114 and contacts the face of the nut. The drill guide bushing 114 is installed in the bore 116 with an anaerobic adhesive so that it may be removed and replaced with a new drill guide bushing when it becomes worn, as inevitably it does after a long period of use.

In operation, jaw inserts 88 for the particular size nut to be drilled to produce the lock wire holes 110 are installed in the collet receptacle 80 of the collet chuck 42 by inserting the jaw inserts 88 in the cup shaped opening in the end of collet receptacle 80 and inserting the screws 98 through the holes 100 in the collet receptacle and threading those screws into the threaded holes 102 in the jaw inserts 88. When the jaw inserts are all installed, a nut 106 is inserted into the hexagonal space between the collet flanges 90 and are bottomed against the bottom of the hexagonal recess provided in the jaw inserts 88. This establishes the axial position of the nut 106 and positions its axial midpoint opposite the bore through the drill guide bushings 114. The handle 72 of the indexer 40 is operated to retract the collet chuck into the body of the indexer 40 which causes the tapered surfaces 76 to slide axially along the tapered surfaces 83 of the indexer, radially compressing the jaw inserts 88 against the nut 106 to hold the nut firmly and to press the ends 120 of the drill guide bushings 114 against the facets 108 of the nuts 106.

The X-Y positioner 46 is adjusted using the adjustment knobs 47 and 47' to align the drill bit 45 with the drill guide bushing 114. The microprocessor 48 is pressed and the microprocessor 48 operates the drill press 44 to extend the quill 43 of the drill press and carry the drill bit 45 into the axial bore through the drill guide bushing 114. The microprocessor is programmed to slow the feed rate as the drill bit approaches the nut surface 108 so that the drill feed is very slow as the drill begins to cut into the angled surface 108. After the hole is started, the microprocessor 48 is programmed to increase the feed rate to a faster feed rate and to cycle the quill 43 repeatedly in and out of the drill guide bushing 114 so that the coolant nozzle 52 and the air nozzle 58 can be used to cool the drill and remove chips from the drill flutes.

When the hole 110 is completely drilled through, the indexing levers 82 and 84 on the indexer 40 are operated to rotate the collet chuck 42 through 120° to present the next drill guide bushing 114 and the lobe 112 with which it is aligned to the line of action of the drill bit 45. The next hole 110 is drilled in the same manner as the first hole and when it is completely drilled through the levers 82 and 84 of the indexer are again operated to index the nut around to present the last lobe 112 to the line of action of the drill. The last hole 110 is drilled and the nut 106 is removed from the collet chuck by shifting the lever 72 to move the chuck to the left in FIG. 3 which relieves the pressure of the jaw inserts 88 on the nut 106. The nut 106 is removed and the next nut is installed and tightened in the collet chuck using the handle 72. The new drill cycle is started and the operator now takes the nut which has just been drilled and deburrs the entry and exit holes on the deburring wheels 70 and 72.

Obviously, numerous modifications and variations of the disclosed preferred embodiment will occur to those of ordinary skill in the art.

Accordingly, it is expressly to be understood that these modifications and variations, and the equivalence thereof, may be practiced while remaining in the spirit and scope of invention as defined in the following claims, wherein I claim:

1. An apparatus for drilling lock wire holes in lock wire nuts, comprising:
    a variable speed drill press mounted on a work surface, said drill press having a vertically movable drill quill supporting a rotating drill spindle on one end of which is mounted a drill chuck for holding and driving a drill bit for drilling a hole in said lock wire nuts;
    an N/C microprocessor coupled to said variable speed drill press for controlling the vertical motion of said drill quill in a peck drill cycle;
    a nut holder, including a collet chuck having three jaw inserts, and a chuck indexer for positioning said chuck in any of a plurality of angular positions about a central longitudinal axis through said chuck;
    a drill guide in each of said jaw inserts for guiding said drill bit at an angle against said faces of said nuts;
    an X-Y positioner mounted on said work surface and on which said indexer is mounted for positioning said drill guide precisely in alignment with said drill in said drill press;
    whereby one of said jaw inserts in said collet chuck, is indexed by said chuck indexer to position said drill bushing in said one jaw insert in axial alignment with said drill bit, and said N/C microprocessor controls said drill press to execute said peck drill cycle through said drill guide to drill a lock wire hole through a lobe of said lock wire nut.

2. An apparatus for drilling lock wire holes as defined in claim 1, further comprising:
    a workbench having an upper surface comprising said work surface positioned at a suitable height for a worker to operate the apparatus comfortably.

3. An apparatus for drilling lock wire holes as defined in claim 1, wherein:
    said indexer includes an axial drawbar apparatus that exerts an axial force on said collet chuck;
    said collet chuck includes a tapered surface that engages another tapered surface in said indexer to exert a radial compressive force through said jaw inserts on said lock wire nut to grip said nut tightly during drilling.

4. An apparatus for drilling lock wire holes as defined in claim 3, wherein:
    said drill guide includes a drill guide bushing having a radially inner flat face lying at a 30° to the longitudinal axis of said bushing;
    whereby said bushing face lies flat against a face of said nut and is pressed thereagainst with a pressure exceeding 50 PSI to minimize the turning effect of the angled face of said nut on said drill bit.

5. A process for drilling lock wire holes in nuts, comprising:
    positioning said nut within three jaw inserts, at least one of said jaw inserts having a drill guide bushing located therethrough on an axis intersecting one of the lobes of said nut;
    applying a radial force on said jaw inserts to press said jaw inserts against the faces of said nut with a force producing a pressure between said nut faces and said jaw inserts of more than 50 PSI;
    positioning said drill guide bushing in said one jaw insert in line with a drill bit in a drill press;
    operating said drill press to rotate said drill bit about said axis and plunging said drill bit through said drill guide bushing to drill a hole through said lobe of said nut.

6. A process as defined in claim 5, wherein:
    said operating step includes a peck drill cycle wherein said drill bit is advanced a short distance into said nut and then backed out and cleared of chips, then advanced again for another short additional distance into said nut, and so on repeatedly until the hole is drilled completely through said nut lobe.

7. A process as defined in claim 6, further comprising:
    blowing a mist coolant and cutting fluid on said drill bit when said drill bit is backed out to cool said bit, moisten said bit with cutting fluid, and facilitate removal of said chips.

8. A process as defined in claim 5, further comprising:
    said radial force is generated by a collet chuck in which said jaw inserts are attached, said collet chuck being held in an indexer for indexing said collet chuck at any of a plurality of preset angular positions about a longitudinal axis through said collet chuck and axially through the center of said nut;
    indexing said indexer 120° to present a second lobe, once removed from said one lobe, to said line of action of said drill bit, and drilling a second lock wire hole in said second lobe.

9. A process as defined in claim 5, further comprising:
    operating a foot pedal to blow air on said collet chuck to blow drill chips clear of said chuck.

10. A process as defined in claim 5, wherein:
    said mist spray operates continuously and drains into a receptacle under said collet chuck for collection and pumping back through said sprayer.

* * * * *